US012659042B2

(12) United States Patent
Tao et al.

(10) Patent No.: US 12,659,042 B2
(45) Date of Patent: Jun. 16, 2026

(54) OPTICAL WIRELESS COMMUNICATION SYSTEM

(71) Applicant: SIGNIFY HOLDING B.V., Eindhoven (NL)

(72) Inventors: Haimin Tao, Eindhoven (NL); Karnekumar Arulandu, Breda (NL); Amir Masood Khalid, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 272 days.

(21) Appl. No.: 18/693,280

(22) PCT Filed: Sep. 16, 2022

(86) PCT No.: PCT/EP2022/075732
§ 371 (c)(1),
(2) Date: Mar. 19, 2024

(87) PCT Pub. No.: WO2023/046578
PCT Pub. Date: Mar. 30, 2023

(65) Prior Publication Data
US 2025/0125880 A1      Apr. 17, 2025

(30) Foreign Application Priority Data
Sep. 21, 2021    (EP) .................................... 21197980

(51) Int. Cl.
*H04B 10/50* (2013.01)
*H04B 10/11* (2013.01)

(52) U.S. Cl.
CPC ............ *H04B 10/504* (2013.01); *H04B 10/11* (2013.01)

(58) Field of Classification Search
CPC ........................ H04B 10/50–588; H04B 10/11
See application file for complete search history.

(56) References Cited

U.S. PATENT DOCUMENTS

| | | | | |
|---|---|---|---|---|
| 4,307,469 A | * | 12/1981 | Casper | H04B 10/0795 |
| | | | | 398/195 |
| 6,226,114 B1 | * | 5/2001 | Ashkeboussi | H04B 10/504 |
| | | | | 398/9 |
| 7,369,591 B1 | | 5/2008 | Ziazadeh | |
| 8,203,777 B2 | | 6/2012 | Smith et al. | |
| 8,472,488 B2 | | 6/2013 | Ichino et al. | |

(Continued)

FOREIGN PATENT DOCUMENTS

| | | |
|---|---|---|
| EP | 0574816 A1 | 12/1993 |
| WO | 2020008566 A1 | 1/2020 |

*Primary Examiner* — Casey L Kretzer

(57) ABSTRACT

An optical wireless communications transmitter comprising a laser diode (82) such as vertical cavity surface emitting laser, VCSEL, a bias current delivery circuit (85) for delivering a bias current to the VCSEL, a modulator (81) for injecting a modulation current to the VCSEL superposed with the bias current and a temperature sensor for sensing a temperature associated with the VCSEL. A controller (84) is adapted to set the bias current and the current modulation depth in dependence on the sensed temperature to achieve a target operating condition in the form of a data transmissions rate and where the bias current is set to a lowest possible level with the current modulation depth selected, and when a higher data transmission rate is needed the modulation depth is increased taking into account a current upper limit.

12 Claims, 7 Drawing Sheets

(56) References Cited

U.S. PATENT DOCUMENTS

| | | | |
|---|---|---|---|
| 8,989,227 | B1 | 3/2015 | Yang |
| 10,361,537 | B2 | 7/2019 | Gudaitis et al. |
| 2016/0134389 | A1 | 5/2016 | Murayama |

* cited by examiner

50

Ith as a function of Tc:

| Tc | Ith | Ith_pu |
|---|---|---|
| 25 | 220 | 1 |
| 30 | 225 | 1.023 |
| 40 | 240 | 1.091 |
| 50 | 270 | 1.227 |
| 60 | 300 | 1.364 |
| 70 | 340 | 1.545 |
| 80 | 390 | 1.773 |
| 90 | 450 | 2.045 |

60

| | a2 | a1 | b |
|---|---|---|---|
| Poly | 0.0411998 | -1.21347 | 224.4561 |
| Poly pu | 0.0001873 | -0.00552 | 1.020255 |

62

OPTICAL WIRELESS COMMUNICATION SYSTEM

CROSS-REFERENCE TO PRIOR APPLICATIONS

This application is the U.S. National Phase application under 35 U.S.C. § 371 of International Application No. PCT/EP2022/075732, filed on Sep. 16, 2022, which claims the benefit of European Patent Application No. 21197980.2, filed on Sep. 21, 2021. These applications are hereby incorporated by reference herein.

FIELD OF THE INVENTION

This invention relates to optical wireless communication systems.

BACKGROUND OF THE INVENTION

LiFi (Light Fidelity) is a new type of Optical Wireless Communication (OWC), which also includes Visible Light Communication (VLC). OWC (and hence LiFi and VLC) use light as a media of communication, for replacing cable wire (wireline) communication.

Wireline optical communication, or fiber based optical communication has been around for some time. US2016/0134389 A1 for example discloses a system laser diode emitters arranged to maintain a substantially constant optical power output, by compensating for temperature effects using a temperature feedback control loop. Similarly EP 0574816 A1 discloses a system using a laser diode that uses an optical power feedback loop to achieve a constant, temperature independent, light output.

Light based wireless communication offers the ability for high data rate communication, for example even exceeding 10 Gbit/s, for devices having a line of sight between them. This for example applies to a set of communicating devices within an office environment.

Known LiFi products rely on a grid of optical access points mounted in the ceiling. The beams of these access points are wide enough (and thereby have a large field of view and/or coverage area) to create an overlap with the neighboring access points at the level of the desks beneath. The receiving devices in such a system are typically located at the desks or are being held by hand at a height close thereto.

For ease of installation, the grid of access points is for example aligned with the luminaire grid in the ceiling. Each access point in such an installation must reach (illuminate, in the case of visible light) several square meters and hence illuminates a significant conical area. Such installations may utilize illumination light for the downlink (to the end devices) and may use infrared light for the uplink (towards the access point) so as not to disturb mobile device users. Alternatively, both downlink and uplink may utilize infrared light thereby at least partially disentangling the lighting and communication infrastructure.

To communicate with the access points, a dongle is connected to an end device, which is a user device such as a laptop or tablet. These dongles also emit a similar broad beam to be sure that at least one access point will receive the signal from the dongle. The beams of the access points and the dongles are fixed in direction, so no adjustment of the beam direction is required.

Each access point comprises a modem connected to one or multiple transceivers. The user devices connect to the access point via an optical link and they also comprise a modem connected to one or multiple transceivers.

The function of the modem is to handle the protocols (modulate and demodulate) for transmitting and receiving data over the visible or invisible light connection. The modem transmitter includes an optical frontend which transforms an electrical signal of the transmit data to an optical signal (for example using an LED) and the modem receiver transforms the optical signal to an electrical receive data signal (using a photodiode).

By way of example, the Trulifi 6002 system of Signify has a modem, at most six transceivers (also called LAP) and dongles (also called LAK). The connections between the modem and transceivers are wired (copper or optical fiber based). The connections between the transceivers and the dongles are optical wireless connections. For the data transmission, Time Division Multiple Access (TDMA) is used and the signal transmitted is within the Intermediate Frequency (IF) in the range 2 MHz to 200 MHz. For optical communication, the wavelength used is Infrared, but may also be any other wavelength from 200 nm to 2200 nm. Depending on the distance between the access point and dongle, speed in sense of bitrates of 200 Mbps can be reached.

Signal and power for the dongle are typically interfaced through a USB C connector towards the end of the dongle. Serial data from the USB port is interfaced through reduced gigabit media-independent interface (RGMII) signals towards the baseband of the dongle which performs the signal processing from analog Orthogonal Frequency Division Multiplexing (OFDM) to digital, and the other way around. Conditioning (e.g. amplification, buffering etc.) of the OFDM signal is done by an Analog Front End (AFE). The output and input of the AFE enters the Optical Front End (OFE) where a modulator modulates the LED current (thereby the optical signal) and a Photodetector (PD) circuit converts the received optical signal into an electrical signal.

The access point (i.e. the modem) has similar functionality to the dongle, except that the signals of the optical front end are distributed to the six transceivers. Furthermore, the modem is supplied directly from the mains and interfaces the data through Ethernet. The transceivers are in the sensor slots of luminaires and are powered by the modem.

It is known that the LED based solution has a limitation on the attainable bandwidth. Infrared (IR) LEDs have a higher bandwidth than white LEDs used for general lighting, but the bandwidth is still below 200 MHz.

Laser diodes, such as vertical cavity surface emitting lasers (VCSELs), are high bandwidth devices used in various applications such as Lidar and time-of-flight (ToF) sensors. However, unlike LEDs, the laser diode devices have a threshold current and the threshold current has a strong dependency on temperature. At higher temperatures, the threshold current increases significantly and thus reduces the modulation depth of the modulated output signal for a given DC bias current. Consequently, more distortion occurs at elevated temperatures, which for example for OFDM signals may lead to high bit error rate and thus reduced throughput speed, or even loss of communication link.

It would therefore be of interest to be able to use laser diodes (e.g. VCSELs) in a LiFi system while overcoming the problem of the temperature dependency.

SUMMARY OF THE INVENTION

The invention is defined by the claims.

According to examples in accordance with an aspect of the invention, there is provided an optical wireless communications transmitter, comprising:

a laser diode;

a bias current delivery circuit for delivering a bias current to the laser diode suitable for bipolar signal modulation;

a modulator for injecting a bipolar modulation current to the laser diode superposed with the bias current;

a temperature sensor for sensing a temperature associated with the laser diode; and a controller adapted to set the bias current and the current modulation depth in dependence on the sensed temperature to achieve a target operating condition.

This transmitter, for use in a laser diode based LiFi system, may be optimized in real-time for operating at a highest efficiency, taking into account the operating temperature and the desired performance of the transmitter. The bias current delivery circuit delivers a bias current to the laser diode that enables the use of a bipolar modulation current. In other words, the bias current when combined with the bipolar modulation current, results in a unipolar laser diode current. A temperature feedback is incorporated in the laser diode modulation circuit such that the bias current is made adaptive to the laser diode temperature via an onboard temperature sensing element. The temperature associated with the laser diode is for example the case temperature or the ambient temperature. The controller is also used to set a current modulation depth. The combination of the bias current and the modulation depth defines the operating parameters of the laser diode. The modulator for example receives an OFDM signal (or other modulated signal). The modulator may generate the bipolar modulation current based on the received modulated signals.

Conventional OFDM modulation results in a bipolar output signal, having positive and negative values. In order to transmit a bipolar modulation signal using Intensity Modulation, or IM, onto a unipolar channel, such as an optical channel for a laser diode, a DC offset may be added to the bipolar signal, which results, in case of OFDM, in a DCO-OFDM signal. Similarly, other modulation schemes, such as single- or multi-tone quadrature amplitude modulation (QAM), may also require a DC offset and thus may be used. Throughout the application, the DC offset is referred to as the bias current.

The temperature measurement of the laser diode means the bias current can be set that just avoids clipping of the modulation signal at the low end, and hence a lowest possible bias current is achieved for a given modulation. Thus the system operates at the highest efficiency (consumes lowest energy) for that modulation depth.

The target operating condition may be one of: a (target) data transmission rate (i.e. a target data throughput) of the laser diode; a maximum efficiency of the laser diode; a desired temperature; or a maximum transmission rate (i.e. a maximum data throughput).

The controller may be adapted to set the bias current and the current modulation depth in dependence on the sensed temperature, where the modulation depth is selected based on the sensed temperature and to achieve a target operating condition, the target operating condition being a data transmissions rate and where the bias current is set to a lowest possible level with the current modulation depth selected, and when a higher data transmission rate is needed the modulation depth is increased taking into account a current upper limit.

In this manner the OWC transmitter may in an adaptive manner perform an adaptation of the modulation depth and the energy dissipation, in a manner that reduces energy dissipation which is particularly relevant for mobile OWC transmitters. By setting the bias current in dependence of the, temperature dependent, threshold current power consumption can be moderated.

The lower bound of the modulation depth preferably takes into account the threshold current of the laser diode at the sensed temperature, in this manner the device may make use of the current to light conversion in an efficient manner.

The desired data transmission rate may be set based on practical metrics such a the transmit-buffer fullness, as a result when the transmit buffer fills-up the transmit power is increased so as to achieve a better SNR at the target receiver, and thus increase the data transmission throughput. Alternatively the communication partners may negotiate the need for a higher (or lower) data transmission rate and subsequently implement such in a dynamic manner.

Preferably, the laser diode is a vertical cavity surface emitting laser (VCSEL). However, it will be appreciated by a skilled person that other laser diodes may be used.

The modulator may comprise a gain adjustment circuit and the controller may be adapted to set a modulation depth by selecting a gain value.

The transmitter may comprise a lookup table for converting a sensed temperature to a threshold current or bias current. This is a feed forward approach for setting the bias current (directly or via the threshold current).

The controller may be adapted to set the current modulation depth of the bipolar modulation current in dependence on a laser diode threshold current corresponding to the sensed temperature and a maximum current. Here the current modulation depth is the peak-to-peak value of the bipolar modulation current.

For a given temperature, a threshold current can be derived for a VCSEL (or other laser diode) based on the device characteristic (e.g., via a lookup table), and then the modulation depth can be determined based on the threshold current. The modulation depth may also take account of a desired current upper limit, in particular a saturation current (to prevent nonlinear saturation) and a desired OFDM PAPR (Peak to Average Power Ratio).

The saturation current of a VCSEL typically reduces as the temperature increases. The threshold current and saturation current thus may be considered temperature dependent parameters for consideration in selection of the bias current and modulation depth, which in turn may be tuned for specific operating conditions. A particular VCSEL (or other laser diode) could be characterized offline (e.g. during manufacturing or after manufacturing). The characterization could provide data for the saturation current at any given temperature (e.g. via a look-up table). Thus, both the temperature dependency of the threshold current and of the saturation current may be known, that is predetermined by characterization, for a given laser diode.

The transmitter may comprise a tracking system for tracking the optimal operating point for any given temperature based on the threshold current at the sensed temperature and the target operating condition. The data throughput may in this way be maximized for a given operating condition.

An advantage of adapting the bias current and/or the modulation current is that no additional information needs to be transmitted to the receiver or indicated by a transmitter.

The controller may be adapted to set the bias current to a lowest possible level with the current modulation depth selected to achieve the target operating condition.

The power required to provide the bias current greater than necessary is, essentially, a power loss as it is not used to transmit data; the bias current is only used to enable the transmission of data (i.e. modulation) by ensuring the superposed current is greater than the threshold current. Thus, setting the bias current to the lowest possible level reduces the potential power loss. Additionally, a higher bias current increases the temperature of the laser diode at a higher rate, thus leading to the need for an increase in the bias current (due to the dependency of the threshold current on temperature).

The bias current may be set based on the threshold current of the laser diode. The threshold current may be found based on the sensed temperature.

In a first embodiment, the target operating condition comprises a data transmission rate, and the controller is adapted to set the bias current and the current modulation depth in dependence on a required amount of data to be transmitted, for example based on a transmit-buffer fullness, an up-stream requested data transmission speed/amount or other a priori knowledge of upcoming traffic.

In this case, the operating conditions are updated dynamically over time to provide a balance between the currently required data transmission rate. For example, when a higher data transmission rate is needed the modulation depth is increased when possible. In practice the modulation depth will limited by a lower and upper bound in the form of a temperature dependent threshold current and the saturation current (or other upper level current). Although in practice it may be possible to (temporarily) run a higher current than the saturation current of the laser diode, such increase no longer increases light output and thus would not enable a higher signal to noise ratio at the receiver side. Therefor, use of such an upper current limit fits well within an energy efficient solution.

The controller may be configured to set the current modulation depth based on the (target) data transmission rate. The lowest bias current may then be found based on a threshold current and the modulation depth. For example, the lowest bias current may be equal to threshold current plus half of the modulation depth. This ensures the lowest bias current is selected, wherein the lowest bias current may be the lowest value for the bias current which ensures the superposed current does not fall below the threshold current.

Similarly, the controller may be configured to set the current modulation depth based on a target rate, which may be defined in dependence of the amount of data to be transmitted. In general, the larger the target data transmission rate, the larger the current modulation depth which is required. The bias current can thereby be controlled adaptively to the needs of the user data transmit buffer. When more data need to be sent, or a higher transmission rate is required, the bias current can be raised until the optimal bias current is reached for the bandwidth and, when there is less data to be sent, the bias current can be reduced to save power and reduce the device temperature or the increase in device temperature and thereby accommodate for future (burst) data transfer(s). In particular, when data communication is periodic in nature, and/or when packet size is communicated, a timely, yet energy efficient transfer may be accommodated.

In a second embodiment, the target operating condition comprises a maximum efficiency for a given modulation depth, and the controller is adapted to set the bias current as the lowest bias current for which the superposed current remains above a threshold current of the laser diode.

Thus, for a given modulation depth, the greatest efficiency is obtained by reducing the bias current, but distortion is avoided by ensuring the modulation current remains above the threshold current.

The target operating condition may comprise a maximum efficiency for a desired signal to noise ratio, and the controller may be adapted to set the current modulation depth in dependence on the desired signal to noise ratio.

In this case, the modulation depth is adjusted to achieve a desired signal to noise ratio and the bias current is reduced as far as possible for that modulation depth.

In a third embodiment, the target operating condition comprises a desired temperature, and the controller is adapted to control the bias current based on the desired temperature and the sensed temperature.

For example, the transmitter may comprise an error amplifier for comparing the sensed temperature with a desired operating temperature, wherein the controller is adapted to control the bias current based on the comparison.

This is, in essence, a feedback approach by which the laser diode temperature is stabilized to a desired (optimal) level by adjusting the DC bias level. This reduces the laser diode power at high temperatures to stay in an efficient operating region. Furthermore, the feedback for example provides operation at highest efficiency instead of maximum throughput.

An upper and lower limit may be set for the bias current based on the desired temperature and, optionally, on the sensed temperature. The bias current may initially be set at the upper limit and may be reduced according to a set of rules. The upper and lower limits may be based on the threshold current at the desired temperature.

The set of rules may comprise the sensed temperature being higher than the desired temperature, the sensed temperature increasing at a rate above a pre-determined temperature increase threshold and/or the sensed temperature being within a predetermined temperature difference.

Using a desired temperature to set the bias current helps maintain a stable temperature at various ambient temperatures and cooling conditions. Thus, if a transmitter (e.g. in a LiFi system) has poor cooling (e.g. small heatsink) or it is operated at high room temperatures, the bias current will be reduced to maintain a lower temperature (e.g. 50 C). It has been observed that temperatures above 50 C will lead to fast increases of the threshold current and, thus, a lower efficiency in VCSELs.

In a fourth embodiment, the target operating condition comprises a maximum data transmission rate, and the controller is adapted to achieve the maximum data transmission rate by setting the bias current between a saturation current and a threshold current for the VCSEL, wherein the threshold current is dependent on the sensed temperature and setting the modulation current depth based on the difference between the bias current and the threshold current.

The bias current may be set half way between the threshold current and the saturation current. The modulation current may be set to twice the difference between the bias current and the threshold current.

In a fifth embodiment, the transmitter comprises a switch for turning off the laser diode based on a transmit enable signal. In this way, the laser can cool while it is not needed for transmission, by turning off the bias current. A greater modulation depth will be enabled when the transmission restarts. The transmit enable signal can directly be generated by a baseband chip (commonly available), or via detection of the signal on the signal path.

It will be appreciated by those skilled in the art that it may be advantageous to combine some of the abovementioned embodiments in a single transmitter by having the controller set different target operation conditions when the situation so requires. For example, a transmitter is envisaged, having multiple modes of operation corresponding with different target operating conditions of different embodiments. The new mode of operation may be selected in dependence of the temperature and the required data communication rate and possibly the current mode of operation.

This approach for example enables a transmitter to switch to a high-throughput mode in accordance with the fourth embodiment, when a data communication rate is required above a pre-determined threshold (which may be temperature dependent), whereas when the required data communication rate drops below the pre-determined threshold or below another threshold (effectively introducing a hysteresis), a different mode of operation is used, such as the maximum efficiency mode of operation when the required data transmission rate allows.

Another scenario enabled by switching is one wherein a transmitter, when as a result of prolonged operation in the high-throughput mode the device/case temperature exceeds a predetermined switching temperature, this may be used to trigger a switch from the maximum throughput mode to a constant temperature mode at a pre-determined target temperature, thereby preventing damage resulting from excessive dissipation. When subsequently the temperature, as a result from reduced traffic drops a pre-determined step-size below the pre-determined target temperature, the transmitter may again, when required so required, switch to the maximum throughput mode.

Another scenario that may be implemented is when the transmitter is operating in a maximum efficiency mode at a low-temperature, and a short burst of data needs to be transmitted, temporarily switching to the high-throughput mode of operation, so as to leverage the fact that a short burst of high-speed communication, is more energy efficient than a longer duration transmission at a lower speed. Upon completion, the device can then default back to the maximum efficiency mode of operation.

By combining various modes of operation with different target operation points, a more versatile transmitter may be obtained.

The invention also provides an optical wireless communications transmitter, comprising:
  a laser diode;
  a bias current delivery circuit for delivering a bias current to the laser diode to enable bipolar signal modulation;
  a modulator for injecting a bipolar modulation current to the laser diode superposed with the bias current; and
  a controller adapted to:
    obtain a first data transmission rate and the corresponding first bias current and first modulation current;
    obtain a second data transmission rate and the corresponding second bias current and second modulation current; and
    set the bias current and/or a depth of the modulation current based on comparing the first transmission rate to the second transmission rate and comparing the corresponding bias currents and modulation currents.

The first data transmission rate is measured at a different time (i.e. before or after) the second data transmission rate. The second data transmission rate may be measured at most ten seconds before/after the measurement of the first data transmission rate. The second rate should preferably be measured within a short time period of the second in order to avoid significant changes in operating conditions (e.g. changes in temperature).

The data transmission rate may be a measurement of the current link speed of the laser diode. Comparing the first transmission rate to the second transmission rate may comprise determining the difference and/or ratio between the first transmission rate and the second transmission rate.

The controller may be adapted to set a depth of modulation in dependence on the set bias current. This enables the modulation depth to be maximized for a given bias current. It avoids modulated signal (e.g. OFDM signal) distortion while maximizing the optical signal modulation depth based on a given operating condition set by the bias current.

The controller may be adapted to set the bias current further in dependence on a required data transmission rate or amount of data to be transmitted. The bias current can thereby be controlled adaptively to the needs of the user data transmit buffer. When more data need to be sent, or a higher transmission rate is required, the bias current can be raised until the optimal bias current is reached for the bandwidth and, when there is less data to be sent, the bias current can be reduced to save power and reduce the device temperature and prepare for future (burst) data transfer.

Setting the bias current and/or the depth of the modulation current may comprise lowering the bias current if the first transmission rate is higher than the second transmission rate and the first bias current is lower than the second bias current or if the first transmission rate is lower than the second transmission rate and the first bias current is higher than the second transmission rate.

Setting the bias current and/or the depth of the modulation current may be based on using a maximum point tracking algorithm. The maximum point tracking algorithm is configured to apply a first perturbation to the bias current and/or the depth of the modulation current after obtaining the first data transmission rate and before obtaining the second data transmission rate. A second perturbation is applied to the bias current and/or the depth of the modulation current after receiving the second data transmission rate, wherein the second perturbation is based on the change in measured data transmission rate between the first data transmission rate and the second data transmission rate caused by the first perturbation.

A maximum point tracking algorithm will apply small perturbations to the bias current and/or the modulation depth of the modulation current based on the changes in the measurements of the data transmission rate (i.e. between the first and second data transmission rates). For example, if a first perturbation increases the data transmission rate, the next perturbation is performed in the same direction as the first perturbation.

The maximum point tracking algorithm is, essentially, an equivalent to the algorithms used in maximum power point tracking for photovoltaics but the data transmission rate is measured instead of maximum power output.

The invention also provides an optical wireless transmission system comprising:
  any of the optical wireless communications transmitters as defined above; and
  a set of one or more receiving units for receiving wireless communication from the optical wireless communications transmitter.

The invention also provides an optical wireless transmission method, comprising:

controlling a laser diode driver to delivering a bias current to a laser diode and to inject a bipolar modulation current to the laser diode superposed with the bias current;

receiving a temperature sensing signal associated with the laser diode; and setting the bias current and the current modulation depth in dependence on the sensed temperature to achieve a target operating condition.

Preferably the setting of the bias current involves modulation depth selection based on the sensed temperature to achieve a target operating condition, the target operating condition being a data transmissions rate and where the bias current is set to a lowest possible level with the current modulation depth selected, and when a higher data transmission rate is needed the modulation depth is increased taking into account a current upper limit.

The invention also provides an optical wireless transmission method, comprising:

controlling a laser diode driver to delivering a bias current to a laser diode and to inject a bipolar modulation current to the laser diode superposed with the bias current;

obtaining a first data transmission rate of the laser diode and the corresponding first bias current and first modulation current;

obtaining a second data transmission rate of the laser diode and the corresponding second bias current and second modulation current; and setting the bias current and/or a depth of the modulation current based on comparing the first transmission rate to the second transmission rate and comparing the corresponding bias currents and modulation currents.

The invention also provides a computer program comprising computer program code means which is adapted, when said program is run on a computer, to implement any of the afore-mentioned optical wireless transmission methods.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

10

Figure 11:
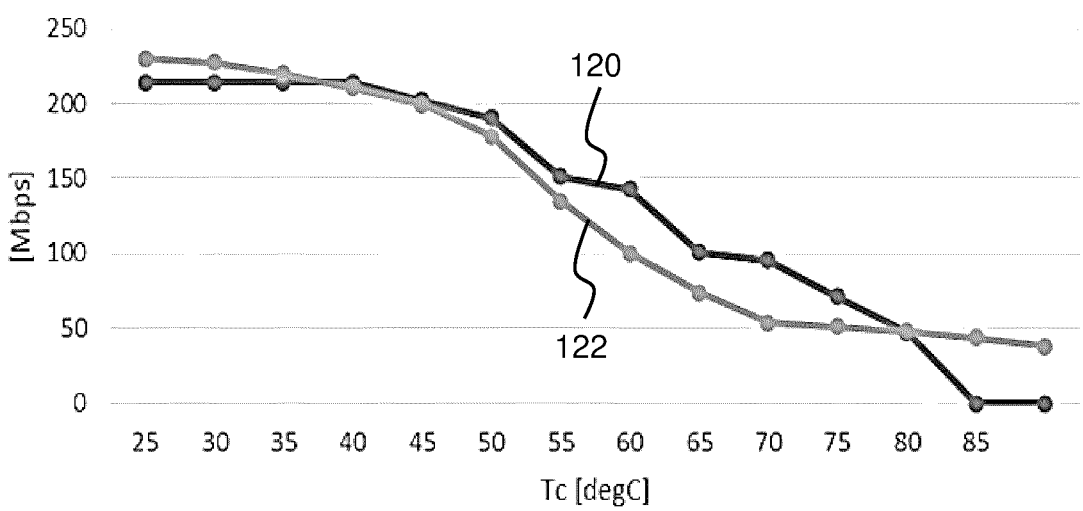
Figure 12:
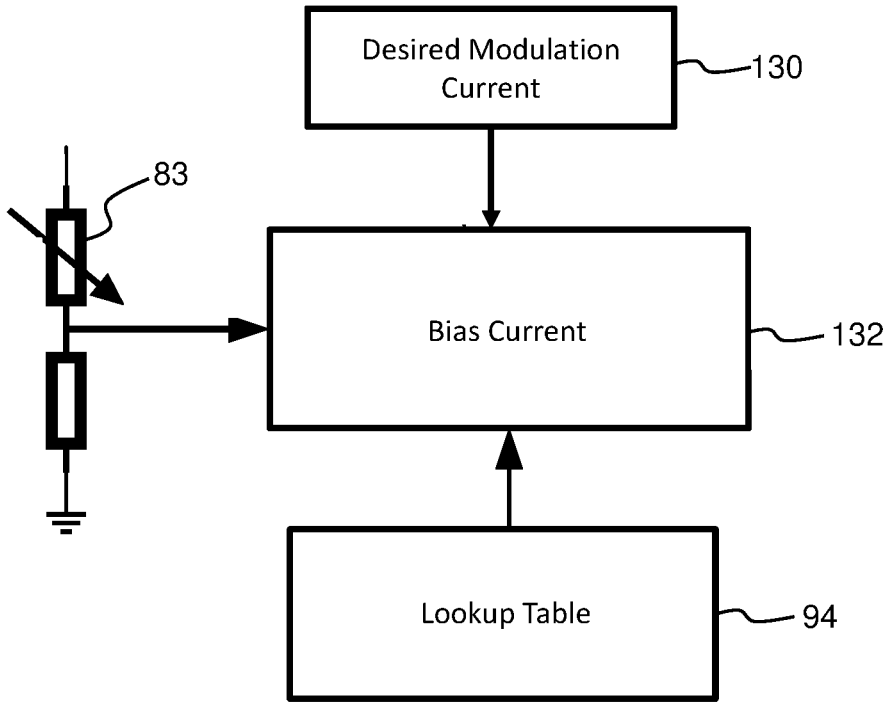

FIG. 11 shows the data throughput of a VCSEL-based transmitter at different temperatures; and FIG. 12 shows a third example for the control circuit.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an optical wireless communications transmitter comprising a laser diode, such as vertical cavity surface emitting laser (VCSEL), a bias current delivery circuit for delivering a bias current to the laser diode, a modulator for injecting a bipolar modulation current to the laser diode superposed with the bias current and a temperature sensor for sensing a temperature associated with the laser diode. A controller is adapted to set the bias current and the current modulation depth in dependence on the sensed temperature to achieve a target operating condition.

The following examples are given based on the use of a VCSEL. However, it will be appreciated by a skilled person that other laser diodes may also be used as described below.

Figure 1:
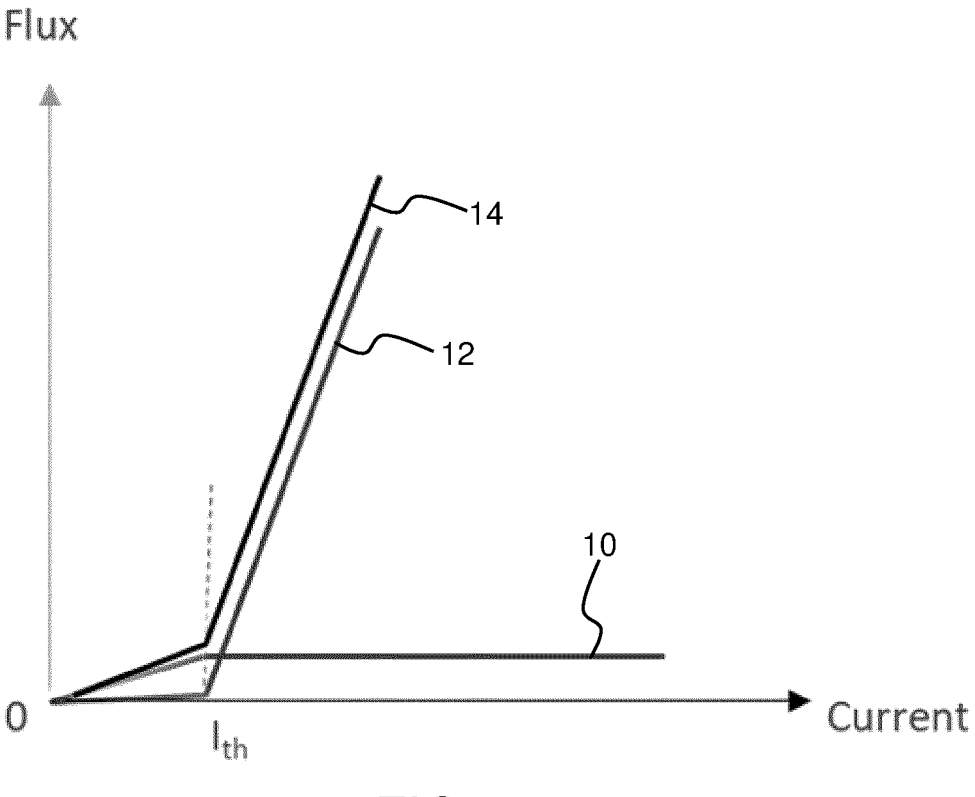
FIG. 1 shows the output light flux versus current for a VCSEL.

The following examples make use of a VCSEL for generating the communication light within a LiFi system. Before explaining the operation of the system, the operating modes of a VCSEL system will first be described with reference to FIG. 1, which shows the output light flux versus current.

Plot 10 shows the spontaneous emission (LED mode) of a VCSEL and plot 12 shows the stimulated emission (lasing mode) of the VCSEL. The total emission of the VCSEL is shown as plot 14.

The typical characteristics of a VCSEL are well known. When the current is below a threshold $I_{th}$ it operates in spontaneous emission mode and has a very poor efficiency. Once the current rises above the threshold current $I_{th}$, stimulated emission dominates the optical output. This is the mode where a VCSEL is intended to operate. The spontaneous emission does not increase anymore once the current is above the threshold current $I_{th}$ and the injected current is taken away by stimulated emission.

The flux $\Phi = \eta(I_F - I_{th})$, where n is the efficiency of stimulated emission, and $I_F$ is the VCSEL forward current. The forward current $I_F$ is the total injected current. In essence, the flux output only counts for an injected current above the current threshold $I_{th}$.

Once the VCSEL materials are chosen, the VCSEL bandwidth will depend on the volume of the active region, the photon lifetime, t (which depends on the mirror reflectivity) and the bias current, $I_{bias}$ (i.e. the higher the bias, the faster the response).

A smaller device leads to higher bandwidth, but the smallest size is limited by lithography and the thermal conductivity limit.

Figure 2:
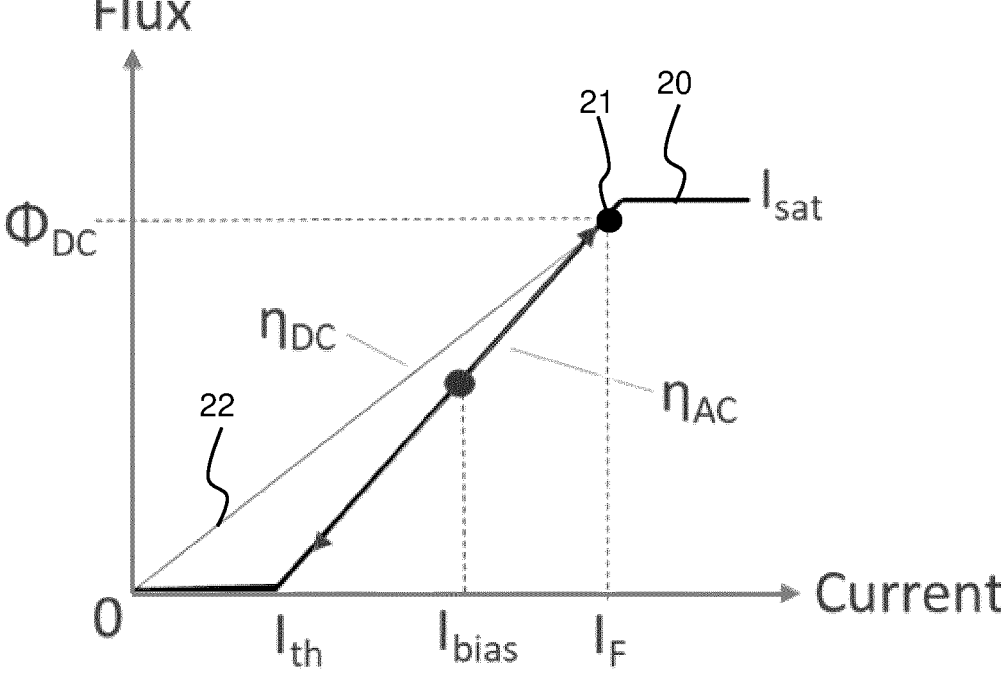
FIG. 2 illustrates the DC efficiency and AC efficiency of a VCSEL.

From a practical point of view, the efficiency of a VCSEL can be modeled as "DC efficiency" and "AC efficiency" (also called slope efficiency). FIG. 2 illustrates the DC efficiency and AC efficiency of a VCSEL. Plot 20 shows the total emission of a VCSEL and shows the flux versus current for the VCSEL. A DC operating point 21 is identified with efficiency $\eta_{DC}$ at forward current $I_F$. It also shows the threshold current $I_{th}$, a bias current current $I_{bias}$ and a saturation current $I_{sat}$.

The DC efficiency is determined by the flux divided by the forward current $I_F$:

$$\eta_{DC} = \frac{\Phi_{DC}}{I_F} \tag{1}$$

In general, the DC efficiency is the slope of line 22, which is a straight line from the origin to the DC operating point 21.

The AC efficiency is defined by the slope of the flux versus current curve in the linear region:

$$\eta_{AC} = \frac{\Phi_{AC}}{I_{AC}} = \frac{\Phi_{DC}}{I_F - I_{th}} \tag{2}$$

The AC efficiency is higher than the DC efficiency because the threshold current $I_{th}$ is not counted. The VCSEL is to be used in the linear region and thus, the AC efficiency is typically more important for OFDM signal modulation than the DC efficiency.

As shown in FIG. 2, at the low end, the flux is bounded by the threshold current $I_{th}$. Meanwhile, at the high end, the flux is bounded by the droop effect, and thus a saturation current $I_{sat}$ of the VCSEL. Saturation may take place gradually.

Figure 3:
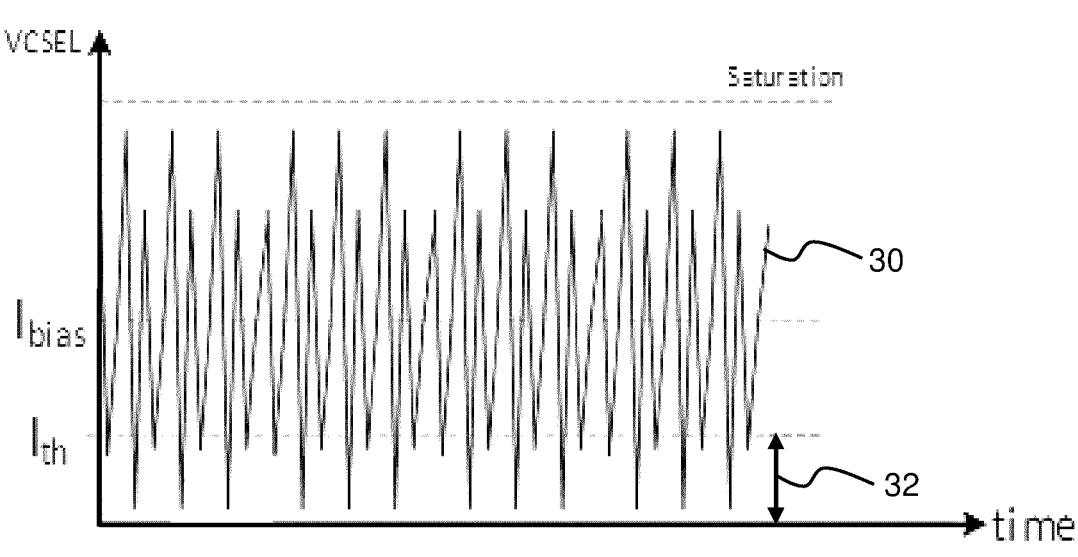
FIG. 3 shows a superposed current injected into a VCSEL.

FIG. 3 shows a superposed current injected into a VCSEL. Plot 30 shows the change in current (y axis) with respect to time (x axis). An optical OFDM modulator may superpose the modulation current (i.e. the modulated signal) on the bias current $I_{bias}$. An OFDM signal is composed of multiple subcarriers and conventionally has a near-white spectrum. The Peak to Average Power Ratio (PAPR) depends on the number of subcarriers and other factors. Typically, PARR=12 dB is used in conventional VCSEL designs (i.e. the signal peak is about 4 time the rms value).

When the (negative) peak falls below the threshold current $I_{th}$, no light may be generated for that peak. This is shown as region 32 of FIG. 3. This leads to clipping of the signal and thus distortion. On the other hand, when the positive peak approaches the VCSEL saturation current $I_{sat}$, the signal experiences a nonlinear saturation effect, which also lead to distortion.

The saturation current $I_{sat}$ represents an upper current limit where the nonlinear effect of a given VCSEL becomes unacceptable. Similarly, the threshold current $I_{th}$ represents a lower current limit where the nonlinear effect of a given VCSEL becomes unacceptable. In other words, the threshold current $I_{th}$ and the saturation current $I_{sat}$ are defined by the lower and upper current limits, respectively, where the flux no longer has a linear relationship with the current.

Since an OFDM system is sensitive to nonlinear effects in the signal chain, it is desirable to avoid signal distortion. From a power consumption point of view, the bias current $I_{bias}$ should be set as low as possible, just before clipping takes place at the threshold current $I_{th}$. Therefore, it may be advantageous to set a bias current $I_{bias}$ based on the threshold current $I_{th}$ in order to, for example, maximize the data throughput.

Figure 4:
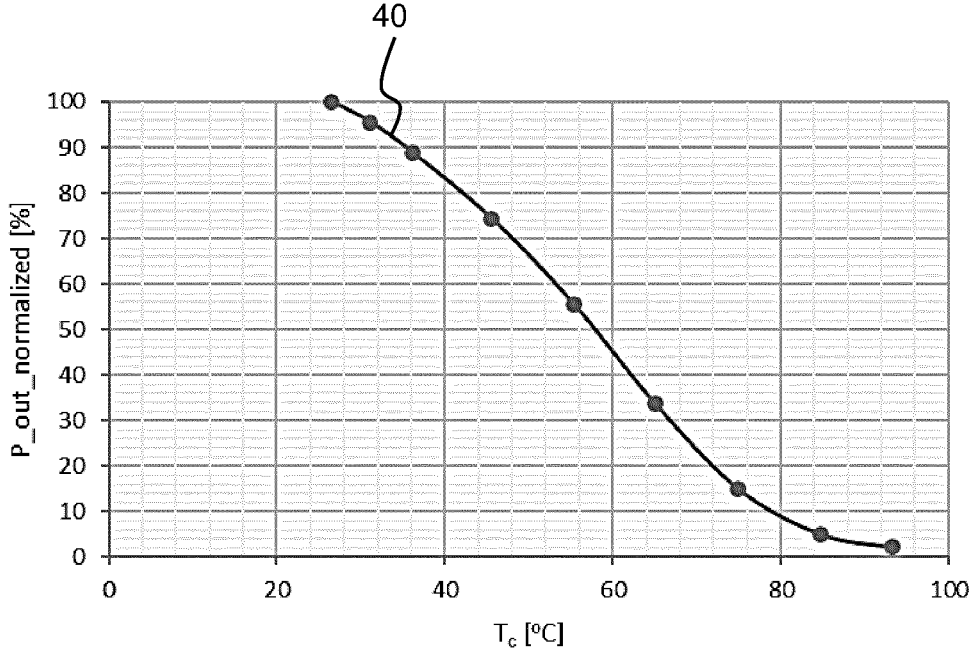
FIG. 4 shows the output power (normalized) versus the case temperature.

The output power by the VCSEL is dependent on temperature. FIG. 4 shows the output power (normalized) versus the case temperature $T_c$. The plot 40 shows the change in normalized power output by a VCSEL when the bias current is set to 400 mA and the temperature of the VCSEL is increased by an external heating source.

It is noted that the temperature dependency in fact relates to the VCSEL junction temperature, Tj. However, the junction temperature cannot be directly measured. Instead, a temperature sensor (a negative temperature coefficient, NTC, sensor) is placed physically near the VCSEL package on the PCB. The measured temperature is the so-called case temperature $T_c$. The temperature sensor can also be placed on a heatsink for cooling the VCSEL, or at any location that gives a meaningful representation of Tj.

$T_c$ is not equal to Tj, but for a given heat dissipation and junction-to-case thermal resistance, Rjc, the junction temperature can then be determined.

$T_c$ is now commonly used to characterize the VCSEL temperature behavior. Thus, the board is characterized in the factory, and for a given $T_c$, the threshold current Ith is measured and a table is built for use in an application. This provides a board-level offline calibration, instead of relying on calibration of the VCSEL itself.

The output power almost linearly decreases with the increase of the case temperature and eventually the power output (and thus the flux output) becomes nearly zero.

The threshold current is substantial compared to the bias current and it increases as the case temperature increases. The power which is required for lasing (i.e. to overcome the threshold current) cannot be used for modulation. Thus, the lasing power can be considered as power loss.

Figures 5, 6:
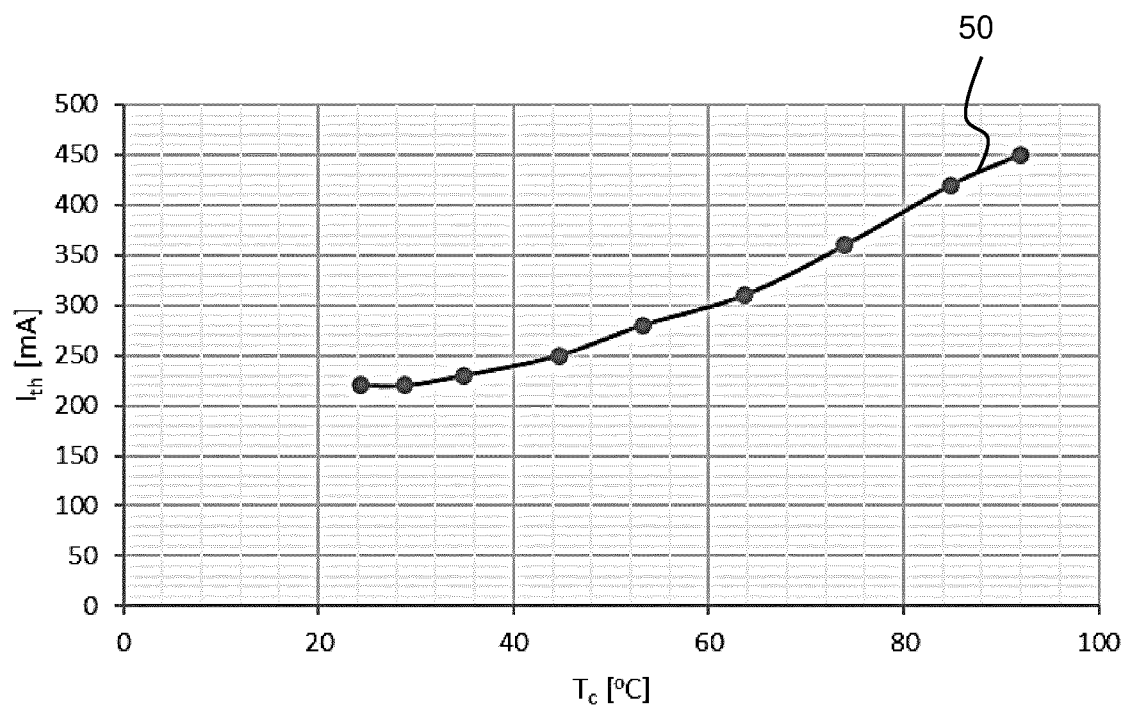
FIG. 5 shows a measured threshold current as a function of case temperature for a particular VCSEL.
FIG. 6 shows two tables with the results plotted in FIG. 5.

FIG. 5 shows a measured threshold current as a function of case temperature for a particular VCSEL. The plot 50 shows the change in threshold current with respect to case temperature. At room temperature (i.e. around 25° C.), the threshold current is just above 200 mA, while at 90° C., the threshold current more than doubles. Thus, a strong dependency of threshold current on the case temperature is thus observed. When the threshold current approaches the bias current, as the case temperature increases, the flux output will reduce to zero.

FIG. 6 shows two tables with the results plotted in FIG. 5. Table 60 shows the numerical values of the threshold current Ith (from plot 50), the case temperatures Tc (from plot 50) and the ratios Ith_pu of each threshold current to the threshold current at a temperature of 25° C. Table 62 shows the coefficients of a $2^{nd}$ order polynomial obtained when fitting a curve to the data shown in table 60, where a2 is the quadrature term, a1 is the liner term, and b is the constant:

$$I_{th}(T_c) = a_2 T_c^2 + a_1 T_c + b \tag{3}$$

The relationship between the threshold current $I_{th}$ and the case temperature $T_c$ is defined by a concave curve (i.e. having a positive derivative).

Figure 7:
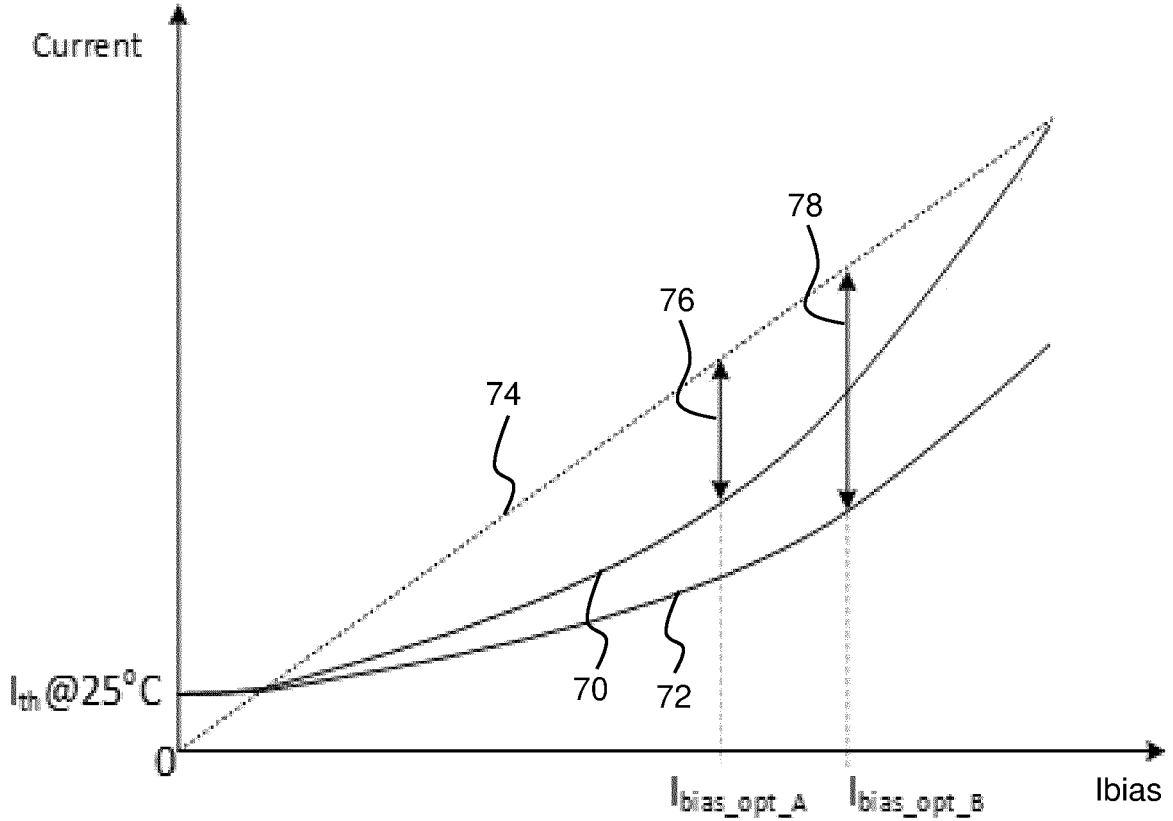
FIG. 7 shows a graph of current against bias current.

FIG. 7 shows a graph of current against bias current. It is used to illustrate a method for finding a bias current that maximizes the modulation depth of the modulation current.

Plot 70 represents the changes in threshold current with respect to bias current for a VCSEL with poor cooling (and thus a with high thermal resistance $R_{th}$). Plot 72 represents the changes in threshold current with respect to bias current for a VCSEL which has good cooling and thus a low thermal resistance $R_{th}$. Plots 70 and 72 show that, as higher bias currents are used, the corresponding threshold current also increases non-linearly.

This is because, as the bias current rises, the VCSEL temperature increases, which, as previously shown, also makes the threshold current increase. The particular temperature rise can be determined by the cooling condition of the components (i.e. the total thermal resistance from the junction to ambient thermal resistance).

The maximum signal modulation depth can be determined by the difference between the bias current and the threshold current ($I_{bias}-I_{th}$) in order to avoid distortion. Line 74 is a line which represents the current being equal to the bias current. The location of the arrows 76 and 78 show the bias currents, for plots 70 and 72 respectively, where a maximum modulation depth may be achieved (i.e. by maximizing ($I_{bias}-I_{th}$)). The length of the arrows 76 and 78 indicate the maximum modulation current. The projected location of the arrows 76 and 78 on the x-axis indicates the bias current which maximizes the throughput for that particular cooling condition.

As the thermal resistance $R_{th}$ is application and device dependent (e.g. dependent on VCSEL package thermal resistance, PCB copper area, heatsink, etc.), it may need to be analyzed case by case during the development of the product. For a product with good cooling, such as shown in plot 72, the bias current which maximizes the modulation depth will be higher than case 70.

Another factor to consider is the efficiency of the VCSEL. At large forward currents, the droop effect may kick in and the flux output may not increase linearly with the forward current. A saturation current may be used as the current at which the flux output is no longer linear with the forward current. The saturation current may become a limiting factor for the selection of an optimal bias current in a design with low thermal resistance $R_{th}$. The droop effect at high currents (i.e. higher than the saturation current) may lead to nonlinearity and distort the OFDM signal.

Figure 8:
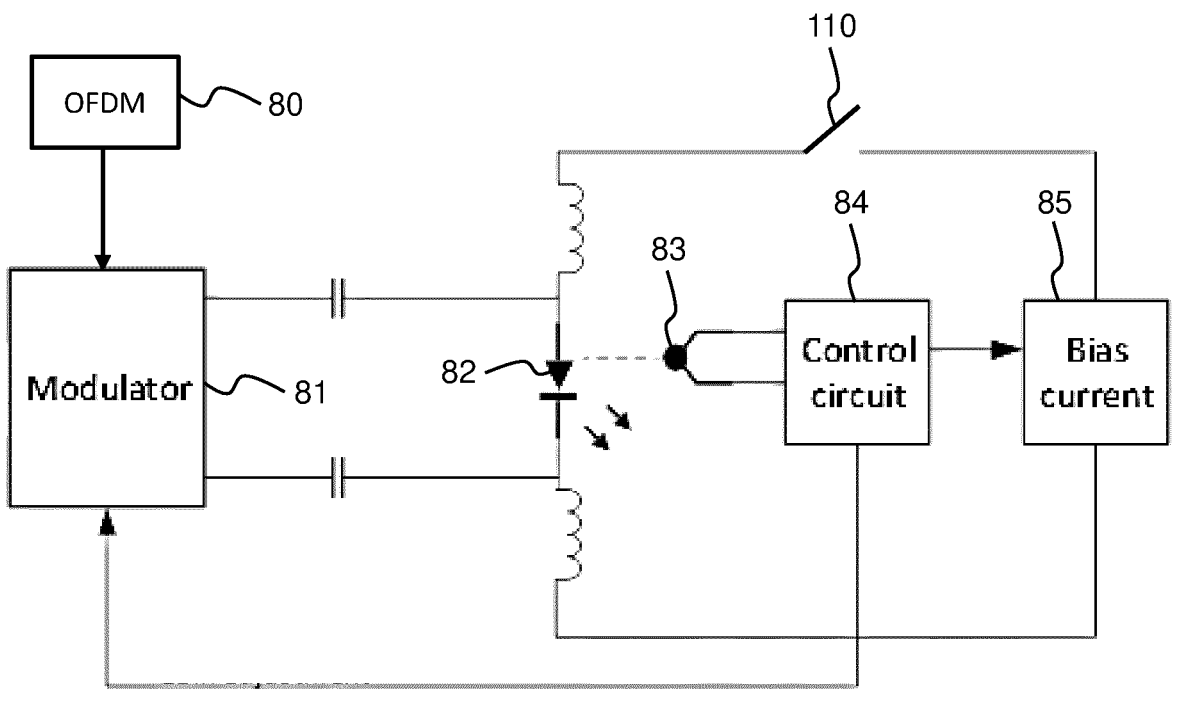
FIG. 8 shows an example of an optical wireless transmitter circuit using a VCSEL with temperature feedback.

FIG. 8 shows a circuit for a transmitter using a VCSEL 82 with temperature feedback. The bias circuit comprises a bias current generator 85 which provides a DC bias current to the VCSEL 82. A temperature sensor 83 (e.g. a Negative Temperature Coefficient (NTC)) resistor is placed near the VCSEL 82 to sense the temperature. The bias current is adjusted by the control circuit 84 based on the temperature.

A baseband chip generates the OFDM signal 80 and provides it to a modulator 81. The modulator 81 converts the OFDM signal (usually a voltage) into a bipolar modulation current with adjustable gain and injects it to the VCSEL via e.g. a bias-Tee topology.

Both the gain of the modulator 81 and the bias current are determined by the control circuit 84 (further explained below). The controller sets the bias current and the current modulation depth in dependence on the sensed temperature in order to achieve a target operating condition. Different target operating conditions may be considered, and examples are given below.

The aim is for example to achieve the lowest bias current while meeting the target operating condition. The target operating condition may be a maximum efficiency for a target data transmission rate, or it may be a maximum data transmission rate, or it may be a maximum efficiency for a given modulation depth, or it may be a maximum efficiency for a given signal to noise ratio, or it may be a desired temperature.

Modulators 81 which may be used include ISL1571 or OPA2673 with a feedback gain of 8. Multiple steps of gain can be used and switched based on the measured temperature and bias (i.e. the DC bias current loop can be slow).

FIG. 8 also shows an optional switch 110, discussed below.

LiFi components can be used in various applications where the ambient temperature can differ significantly. Thus, the bias current for VCSELs used in a LiFi component may need to be adjusted according to the actual case temperature to maximize the channel capability. For example, a ceiling unit (or industrial unit) can have an ambient temperature as high as 40° C. while a USB dongle may have an ambient temperature of 25° C. A higher ambient temperature will lead to higher case temperatures.

An "optimal" bias current can be estimated by a function dependent on the ambient temperature $T_a$ and the transmitter characteristics. The transmitter can be pre-characterized at room temperature (e.g., $T_a$=25° C.) and a relationship between the optimal bias temperature versus the case temperature may already be known and stored, for example, in a lookup table (e.g. see table 60 in FIG. 6). The granularity of a look-up table can be made fine (e.g. measurements in steps of 1 degree C.). Alternatively, a piece-wise linear, or polynomial function can be used (e.g. see table 62 in FIG. 6).

Figure 9:
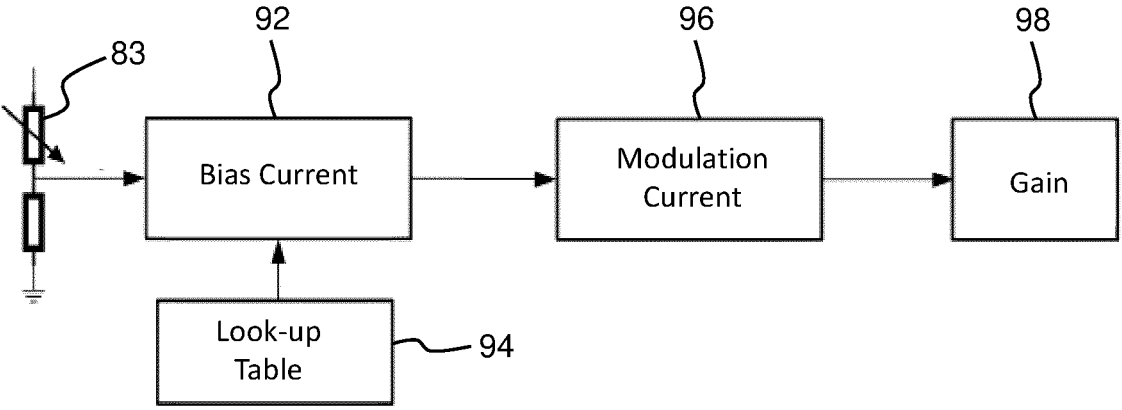
FIG. 9 shows a first example of a control circuit for use in the transmitter circuit of FIG. 8.

FIG. 9 shows a first embodiment for the control circuit. The case temperature $T_c$ is measured by the temperature sensor 83 (e.g. an NTC) and is used to determine a threshold current through a lookup table 94. The bias current 92 may then be determined as:

$$I_{bias} = \frac{1}{2}(I_{sat} - I_{th}(T_c)) + I_{th}(T_c) \tag{4}$$

where $I_{sat}$ is the saturation current and $I_{th}$ ($T_c$) is the threshold current obtained from the look-up table 94 based on the measured case temperature $T_c$.

Then, the modulation current 96 (i.e. the OFDM signal amplitude) is determined and the corresponding gain 98 is set accordingly. The modulation current 96 may be defined as the peak to peak value of the modulation current $I_{pp}$. Thus, the modulation current may be determined as:

$$I_{pp} = 2(I_{bias} - I_{th}(T_c)) \tag{5}$$

Once the bias current 92 and the modulation current 96 are determined, a superposed signal of the bias current 92 and modulation current 96 can be injected into the VCSEL. The output of 92 controls the output level of the bias current generator 85. By determining the bias current 92 and the modulation current 96 in this way, signal distortion is significantly reduced. With this method, it is assumed that, for every degree increase in the ambient temperature, the case temperature will rise by the same amount (which is not exact due to a mix of heat transfer means, i.e. thermal conduction, convection and radiation, in reality but it is reasonably close). The exact case temperature could alternatively be measured but may require different placements of the temperature sensor 83.

In essence, FIG. 9 shows a temperature feedforward circuit and can be implemented with a low cost microcontroller unit (MCU). After power up of the VCSEL, the case temperature will be close to the ambient temperature, and the OFDM signal will be at its highest level. Thus, the initial bias current may be:

$$I_{bias\_init} = \frac{1}{2}(I_{sat} - I_{th}(25°\ C.)) + I_{th}(25°\ C.) \tag{6}$$

As the VCSEL is heated up by the injected superposed current, the case temperature will increase and thus the bias current may need to be reduced. Eventually, a stable operating point will be reached and the control circuit will automatically adapt to the changing case temperature (if it changes). This example proposes the use of the saturation current as the upper limit for the superposed current. This maximizes the useful dynamic range of the VCSEL for any given temperature while significantly reducing distortion.

Figure 10:
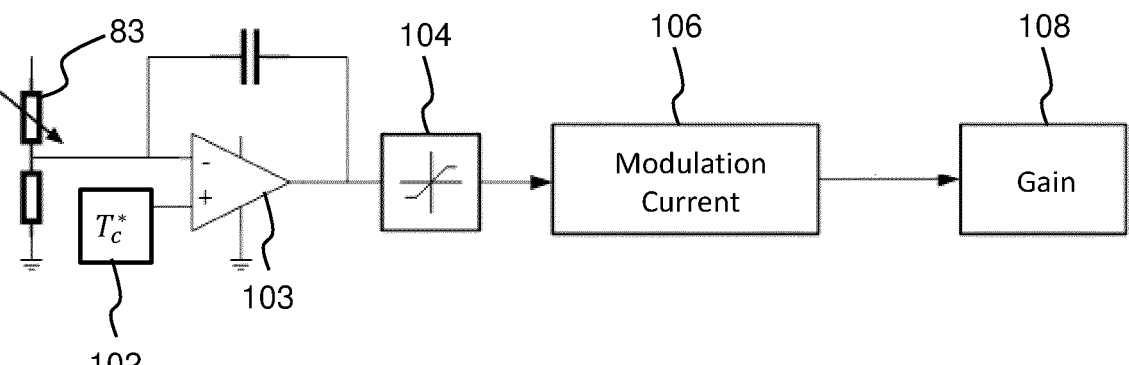
FIG. 10 shows a second example of the control circuit for use in the transmitter circuit of FIG. 8.

FIG. 10 shows a second embodiment for the control circuit. A temperature feedback mechanism is employed in this embodiment. The VCSEL case temperature is sensed by the temperature sensor 83 and then compared to a desired temperature $T_c^*$ (e.g., $T_c^*$=50° C.) given in box 102. The error (e.g. difference) between the case temperature and the desired temperature is amplified and integrated by an error amplifier 103. The output of the error amplifier 103 is passed through a limiter 104 which sets lower and upper limit for the bias current. A resulting bias current (between the lower and upper limit) is then used to determine the depth of the modulation current 106 (i.e. OFDM signal amplitude):

$$I_{pp} = 2(I_{bias} - I_{th}(T_c^*)) \tag{7}$$

where $I_{pp}$ is the peak to peak value (i.e. the depth) of the modulation current. The modulation current 106 can thus be used to determine the gain 108 sent to the modulator. In this embodiment, the modulation current 106 is determined based on the threshold current at the desired temperature and thus there is no explicit need for a lookup table (or otherwise). The output of the limiter 104 controls the output level of the bias current generator 85.

Thus, the VCSEL case temperature can be set to a desired temperature 103 by adjusting the bias current. In general, lowering the bias current will lower the case temperature. The desired temperature can be chosen based on characterization results, such as a knee point of a fitted curve between the threshold current and the case temperature (e.g. as shown in FIG. 5).

After the VCSEL is powered up, the error amplifier 103 outputs a lower and upper limit for the bias current and the resulting bias current may be set to be at the upper limit of the bias current. Thus, the data throughput of the VCSEL will reach its maximum speed for the specified upper and lower limits of the bias current. As the VCSEL is heated up by the injected current, the bias current will need to be reduced (due to the threshold current increasing) until it settles at a steady state value. The method for keeping the VCSEL at a desired temperature can be implemented with an analog circuit or with a low cost MCU.

A lookup table (or other relationships between the case temperature and threshold current) is not necessary for keeping the case temperature at a desired temperature. However, a lookup table could be used to improve the performance of the circuit by, for example, replacing the desired temperature with the actual case temperature when calculating the modulation depth. A user application may be used to vary the desired temperature as and when required based on various conditions and/or requirements.

The optional switch 110 in FIG. 8, in series between the bias current generator 85 and the VCSEL 82, will now be explained. Wireless communication often has a burst nature. A transmitter may not always be in use as the wireless medium may be busy or the host may not have data to transmit or receive. A transmit enable (TX_EN) signal can be introduced to the circuit (i.e. via switch 110). When the transmitter is idle or receiving a signal, the VCSEL can be turned off to reduce power dissipation. In this way, the case temperature will gradually lower and a maximum modulation depth can be utilized for the next transmission. The case temperature may show certain excursions due to data traffic across the device comprising the transmitter (e.g. LiFi device).

In summary, unlike LEDs, laser diodes such as VCSELs have strong temperature dependency. The threshold current is of particular relevance to laser diodes. The threshold current, together with the saturation current, determine the maximum depth of the modulation current. A fixed modulation depth (e.g. like in LEDs) will result in severe performance drops at high temperatures due to clipping of the signal at the low end (i.e. near the threshold current) leading to distortion noise in the OFDM.

Thus, the modulation depth of the modulation current may have to be limited by taking into account the case temperature. Therefore, it is recommended that the modulation depth is adapted based on the case temperature to take into account increases of the threshold current caused by increases in case temperature. Such a circuit can be implemented with temperature feedback in the circuit and/or according to a-priori knowledge (i.e. threshold current and/or saturation current at different temperatures) of the transmitter.

FIG. 11 shows the data throughput of a VCSEL-based transmitter at different temperatures. Plot 120 shows the data throughput of a simulated VCSEL model at different case temperatures. Plot 122 shows measured data throughput of a VCSEL transmitter at different case temperatures. Both the simulated VCSEL model and the VCSEL transmitter had a fixed bias current.

In practice, it may be advantageous to implement a temperature feedback within the transmitter where a bias current is set for a given thermal resistance and the ambient temperature (if ambient temperature measured instead of case temperature). The particular bias current to be used at any particular ambient temperature can be determined by, for example, determining the relationship between threshold current and the case temperatures. In practice, the thermal resistance of a transmitter will not change significantly over time and, thus, a relationship between bias current and ambient temperature can be determined for each transmitter prior to use. The modulation depth can also be determined for particular ambient temperatures. This is a tradeoff between distortion and signal power and a "best" setting (i.e. bias current and modulation depth) can be approximated for any given ambient temperature.

Optimal operating point tracking algorithms (i.e. similar to the maximum power point tracking (MPPT) algorithms used in solar inverters) may be implemented where the data throughput of a VCSEL is to be maximized. The algorithm introduces a small perturbation by increasing (or decreasing) the bias current and then checks whether the link speed (i.e. data throughput) increases and, if so, keeps increasing the bias current in that direction (or reduce the bias if the link speed decreases). In general, the direction of a perturbation may be given by the difference or the ratio between the data transmission rate before and after the perturbation.

This may be useful when there is no prior knowledge of the transmitter (e.g. the VCSEL characteristics such as the thermal resistance, relationship between bias current and case temperature etc.).

This may also be useful when there is no temperature sensing of the VCSEL. However, the perturbations could also be used with temperature sensing of the VCSEL to, for example, improve the bias current for any given target operating condition.

From a power saving perspective, the bias current can be adapted to the needs of the user data transmit buffer or other information on the need for a higher capacity data link. When there is a large amount of data which needs to be transmitted, the bias current can be raised (e.g. until the "optimal" bias current is reached for the particular measured case temperature). When there is a relatively small amount of data to be transmitted, the bias current can be reduced in order to save power and, thus, further reducing the case temperature. This reduction in case temperature may prepare the VCSEL for future (burst) data transfer at higher modulation depth.

Furthermore, it is possible to include (thermal) energy storage elements (e.g. gold-caps) for higher bursts of data throughput at higher light output flux. Such storage elements increase the time constant of the transmitter (relating to the time taken for the case temperature to increase based on output flux) and thus allowing for longer high-speed burst without significantly raising the VCSEL temperature.

FIG. 12 shows a third embodiment for the control circuit. In this case, the bias current 132 and modulation depth can be adapted for operating the transmitter at a maximum efficiency. A desired modulation current depth 130 can be determined. The transmitter may check for a user data buffer status and set a target for a signal to noise ratio (SNR), such that the desired modulation current depth 130 is set based on the target SNR.

In some cases, only a low SNR may be needed (e.g. for low data throughput) and thus the desired modulation depth 130 can be lowered (further lowering the bias current 132) and thus lowering the required power. Alternatively, for short bursts of high data through a large SNR may be advantageous to increase efficiency.

Alternatively, the desired modulation current depth 130 can also be predetermined/fixed at a desired level without taking the SNR into account. Based on case temperature obtained via the temperature sensor 83, the threshold current can be determined via a lookup table 94 (or otherwise) and thus the bias current 132 can be determined:

$$I_{bias} = \frac{1}{2} I_{pp}^* + I_{th}(T_c) \qquad (8)$$

where $$I_{pp}^*$$

is the desired modulation current depth 130.

This becomes the lowest possible bias current 132 for the desired modulation current depth 130 (and the determined threshold temperature) and thus the transmitter operates at the highest efficiency (i.e. consumes the lowest possible energy).

The desired modulation current depth may be determined via an open-loop. When using an open loop, there is a fixed ratio between the input signal (i.e. the OFDM signal and, optionally, target SNR) and the output signal (i.e. the modulation current depth) such that the input signal can be adapted to meet the desired modulation current depth 130.

The Coding Scheme used for the modulation could also be changed based on a target data throughput for the VCSEL. The bias current and/or the modulation depth may then be set further based on the Coding Scheme used.

Preferably, measurements of the case temperature, the ambient temperature, the target data throughput and/or any other measurements previously described are continuous measurements. However, it is also possible for any of the afore-mentioned measurements to be done periodically.

Generally, short high power bursts of the VCSEL are more efficient. However, at elevated junction temperatures, the output power will be limited and, thus low power (lower data throughput) may be preferred.

The skilled person would be readily capable of developing a controller (i.e. control circuit) for carrying out any herein described method. Thus, each step of a flow chart may represent a different action performed by a controller, and may be performed by a respective module of the processing controller.

The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. If the term "adapted to" is used in the claims or description, it is noted the term "adapted to" is intended to be equivalent to the term "configured to". Any reference signs in the claims should not be construed as limiting the scope.

The invention claimed is:

1. An optical wireless communications, OWC, transmitter, comprising:
   a laser diode;
   a bias current delivery circuit for delivering a bias current to the laser diode suitable for bipolar modulation;
   a modulator for injecting a bipolar modulation current to the laser diode superposed with the bias current;
   a temperature sensor for sensing a temperature associated with the laser diode; and
   a controller adapted to set the bias current and a current modulation depth in dependence on the sensed temperature, where the current modulation depth is selected based on the sensed temperature and to achieve a target operating condition, the target operating condition being a data transmission rate and where the bias current is set to a lowest possible level with the current modulation depth selected, and when a higher data transmission rate is needed the current modulation depth is increased taking into account a current upper limit.

2. The OWC transmitter of claim 1, wherein when the target operating condition comprises a maximum data transmission rate, the controller is adapted to achieve the maximum data transmission rate by:
   setting the bias current between a saturation current and a threshold current for the laser diode, wherein the threshold current is dependent on the sensed temperature; and
   setting the current modulation depth based on a difference between the bias current and the threshold current.

3. The OWC transmitter of claim 1, comprising a switch for turning off the laser diode based on a transmit enable signal.

4. The OWC transmitter of claim 1, wherein the bias current is based on a threshold current of the laser diode at the sensed temperature and half of the current modulation depth, the current modulation depth being a peak-to-peak value of a bipolar modulation current.

5. The OWC transmitter of claim 4, wherein the current modulation depth takes into account the threshold current of the laser diode at the sensed temperature and a current upper limit is one of a saturation current and a desired Optical Frequency Domain Multiplexing (OFDM) Peak to Average Power Ratio.

6. The OWC transmitter of claim 1, wherein the data transmission rate is adapted based on a transmit-buffer fullness, or an up-stream requested data transmission speed/amount.

7. The OWC transmitter of claim 1, wherein the current modulation depth and bias current are dynamically updated over time based on the required data transmission rate.

8. An optical wireless transmission system comprising:
   the optical wireless communications transmitter of claim 1; and
   a set of one or more receiving units for receiving wireless communication from the optical wireless communications transmitter.

9. An optical wireless communication, OWC, transmission method, comprising:
   controlling a laser diode driver to delivering a bias current to a laser diode and to inject a bipolar modulation current to the laser diode superposed with the bias current;
   receiving a temperature sensing signal associated with the laser diode; and
   setting the bias current and a current modulation depth in dependence on the sensed temperature, where the current modulation depth is selected based on the sensed temperature to achieve a target operating condition, the target operating condition being a data transmission rate and where the bias current is set to a lowest possible level with the current modulation depth selected, and when a higher data transmission rate is needed the current modulation depth is increased taking into account a current upper limit.

10. The OWC transmission method of claim 9, wherein the bias current is based on a threshold current of the laser diode at the sensed temperature and half of the current modulation depth, the current modulation depth being a peak-to-peak value of a bipolar modulation current.

11. The OWC transmission method of claim 10, wherein the current modulation depth takes into account the threshold current of the laser diode at the sensed temperature.

12. A non-transitory computer readable medium comprising instructions which, when executed by a processor of a computer, cause the processor of the computer to perform the method of claim 9.

* * * * *